July 18, 1944.   D. S. MUZZEY, JR   2,353,920
VIBRATION DETECTOR
Filed May 30, 1942   2 Sheets-Sheet 1
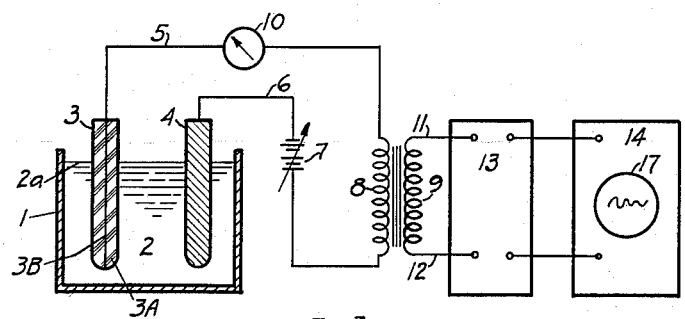
Fig. I
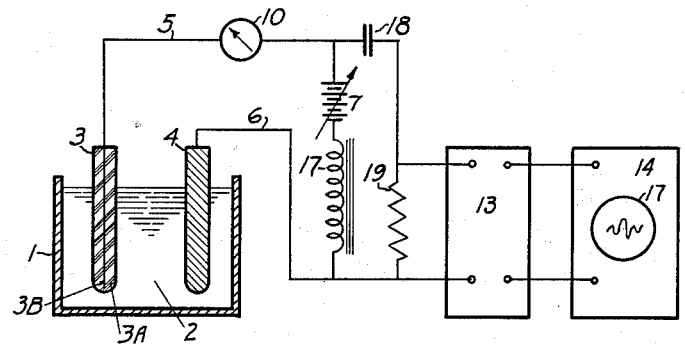
Fig. II
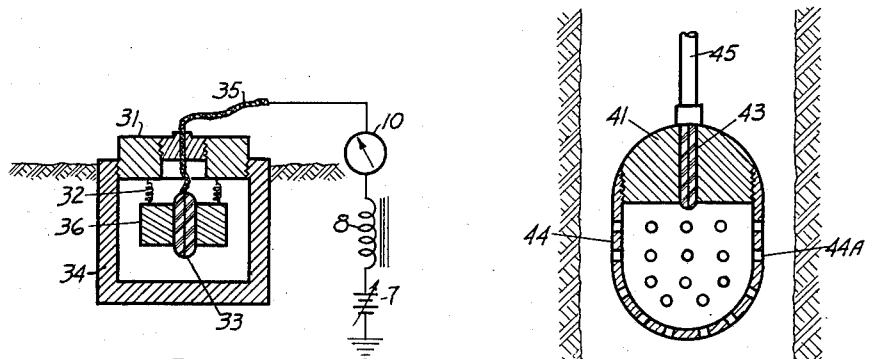
Fig. III   Fig. IV
Inventor: David S. Muzzey Jr.
By his Attorney:

July 18, 1944.  D. S. MUZZEY, JR  2,353,920
VIBRATION DETECTOR
Filed May 30, 1942  2 Sheets-Sheet 2
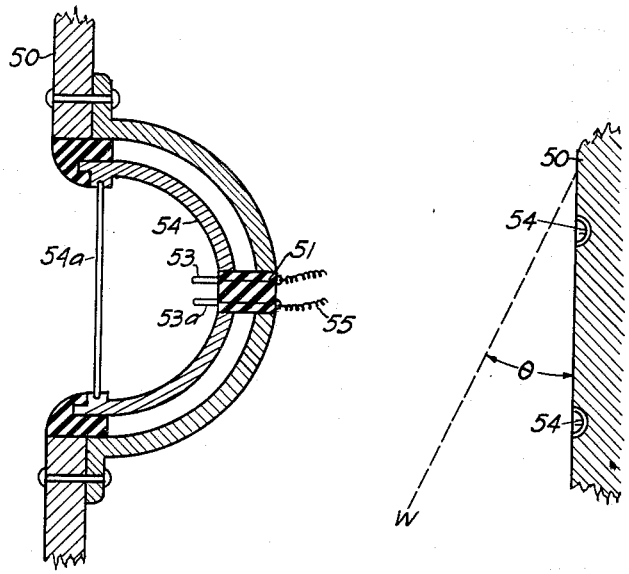
FIG. V  FIG. VII
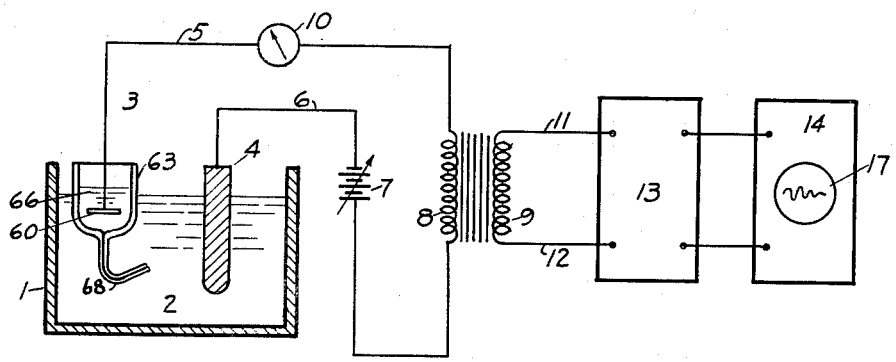
FIG. VI
Inventor: David S. Muzzey, Jr.
By his Attorney:

Patented July 18, 1944

2,353,920

UNITED STATES PATENT OFFICE 2,353,920

VIBRATION DETECTOR

David Saville Muzzey, Jr., Houston, Tex., assignor to Shell Development Company, San Francisco, Calif., a corporation of Delaware Application May 30, 1942, Serial No. 445,413

1 Claim. (Cl. 177—352)

This invention pertains to improvements in methods and apparatus for translating the mechanical motion of solid, liquid and gaseous media, such as elastic or acoustic vibrations or waves, into corresponding variations of voltage or current in an electrical circuit.

Various means hereinbelow referred to as detectors have been devised and are at present in use for converting mechanical motions or vibrations into electric voltage or current impulses.

For example, in the carbon microphone or detector, a mechanical motion is caused to vary the pressure between carbon granules, whereby their resistance to electric current, and hence the intensity of the current flowing in the microphone circuit, is varied.

In the condenser microphone or detector, a mechanical motion is caused to vary the separation of the plates of a condenser whereby its capacity, and hence the impedance of the microphone circuit, is varied.

In the electromagnetic detector, seismometer or pick-up, a mechanical motion is caused to move a wire or a coil of wire with respect to a magnetic field, whereby a voltage is generated as a function of said motion.

In spite of the many refinements brought into the construction and use of the above devices, they are still, for many applications, open to objections, such as inconvenient physical dimensions, unsuitable internal impedance, a complicated and delicate construction, which increases their cost and makes them subject to frequent breakdowns, etc.

It is, therefore, an object of this invention to provide a novel oscillation or vibration detector of extremely simple construction and high sensitivity.

It is also an object of this invention to provide a detector wherein the wave energy of the oncoming oscillations or vibrations is communicated to said detector without appreciable loss at the surface of contact between said detector and the medium through which said waves travel.

It is also an object of this invention to provide a detector wherein the sensitive element is formed by two electrodes in contact with a body of liquid, the intensity of the current flowing through said liquid between said electrodes being caused to vary as a function of the vibrations or oscillations communicated to said liquid.

These and other objects of the present invention will be understood from the following description, taken with reference to the attached drawings, wherein:

Fig. 1 is a schematic circuit diagram of the present detector.

Fig. 2 is another schematic circuit diagram of said detector;

Fig. 3 is a diagrammatic view of an embodiment of the present detector used for seismic exploration;

Fig. 4 is a diagrammatic view of another embodiment of the present detector used for seismic logging;

Fig. 5 is a diagrammatic view of an embodiment of the present detector used for the detection of submarine oscillations or pulsations;

Fig. 6 is a schematic circuit diagram of another embodiment of the present detector; and Fig. 7 is a diagram showing an arrangement of a plurality of devices of the type illustrated in Fig. 5.

The present detector will first be described with regard to the schematic circuit diagrams of Figs. 1, 2 and 6, which will make apparent the principle on which it operates. Actual embodiments of said detector, as used for practical field work, will then be described with regard to Figs. 3, 4 and 5.

Briefly, it has been found that if an electric current is passed between two electrodes out of contact with each other but forming an electrolytic cell by contact with a liquid body, and if mechanical vibrations or oscillations are impressed on said cell, or caused to produce relative motions between one or both of said electrodes and said liquid or electrolyte, the current passing through the cell or the voltage across the cell will, under certain conditions and in the manner described hereinbelow, vary as a function of said vibrations or motions.

While it is not desired to advance here any detailed theoretical explanation of this phenomenon, it is sufficient to state that the latter may be due to a relative displacement of the electrode or electrodes with respect to the electrolytic liquid; to the relative velocity therebetween during said displacement; to chemical reactions induced in the liquid by mechanical vibrations; to the formation, which may be instantaneous, of suspensions or emulsions in the liquid; to various electrode-surface effects, such as the formation of contact potentials, polarization potentials or films, electrokinetic potentials, etc., or to any combination of these and other causes. In general, it may be stated that the impedance of the cell varies with the relative displacement between the electrode and the liquid immediately surrounding it.

Referring to Fig. 1, a vessel 1 is filled with an electrolyte 2. The electrodes 3 and 4 are immersed in said electrolyte, and are connected in series by means of conductors 5 and 6 with a source of direct current 7, such as a battery of dry cells, a storage battery, etc., whose voltage may be varied as desired by means well known in the art, with a transformer primary 8, and with an indicating device 10, such as a milliammeter.

The secondary 9 of the transformer is connected by means of conductors 11 and 12 with the input of a vacuum tube amplifier 13, whose output voltage is applied to an indicating or recording device 14, such, for example, as a cathode ray oscillograph or a suitable acoustic device of the type of a telephone receiver, a loud speaker, or any other instrument for indicating the presence, nature or magnitude of electric voltage or current variations.

The electrode 4 is made of any suitable material, metal or alloy, such as silver, copper, iron, aluminum, carbon, graphite, and is given any desirable shape, such as that of a plate, a cylinder, etc., provided that its surface of contact with the electrolyte 2 be large as compared with that of electrode 3. Thus, electrode 4 may be entirely eliminated, for example, by constructing the vessel 1 of a metallic or electrically conductive material and electrically connecting the wire 6 thereto.

The electrode 3, which is the sensitive electrode, is made to have a very small surface of contact with the electrolyte 2. It may, therefore, as shown in the drawing, consist of a thin wire, sealed in a protective covering 3A, such as glass, ebonite or any other non-conductive material, whereby the wire 3B comes into contact with the electrolyte only over the very small area of the cross-section at its lower end.

The sensitive electrode in contact with the electrolyte may be made of a metal, such as platinum, copper, silver, aluminum, or of any other suitable conducting material, such as carbon or graphite, or may comprise another electrolytic solution whose area of contact with the electrolyte of the cell proper is restricted.

Some liquids, such as drilling mud, muddy water, etc., do not give good results with a metallic sensitive electrode. With these liquids, a polarizing current sufficient to make the small electrode suitably sensitive sometimes results in noises detracting from the usefulness of the device. In such cases, an arrangement shown in Fig. 6 may be used to eliminate this difficulty.

Fig. 6 diagrammatically indicates an arrangement similar to those of Figs. 1 and 2, in which like elements are denoted by like numerals.

In this figure, the sensitive electrode generally indicated at 3 consists of a vessel 63 made of glass or other liquid-impervious material, which opens into the electrolyte 2 of the cell 1 only through a capillary tube 68. The vessel 63 is filled with a suitable electrolyte 66 in which is immersed a metal electrode 60, which may be of any desired size and shape. The vibration-sensitive area is in this case the area of contact of the two liquids at, or just beyond, the end of the capillary tube 68 filled with the electrolyte 66 and opening to the electrolyte 2. The surface tension of the electrolyte 66 should be properly selected to maintain the contact area in this desired location. The capillary tube 68 should preferably be inclined at a slight angle outwardly and upwardly in order that any gas which may be formed at the junction may not block the capillary tube. This arrangement has been found to become more sensitive the shorter the capillary tube is made. Best results are obtained when electrolytes 66 and 2 make contact at one or more small sharp-edged holes in vessel 63 with a total area of opening very small compared to the areas of electrodes 4 and 60.

Referring more particularly to Figs. 1 and 2, if a current, whose intensity is observed by means of the indicating device 10, is caused to flow in the cell circuit by applying thereto the voltage of the source 7, it is found that the junction of the electrode 3 with the electrolyte 2 becomes sensitive to mechanical vibrations communicated to the detector and transmitted to said junction through the electrolyte in the form of elastic oscillations.

Only electrode 3 is sensitive to these vibrations, as shown by the fact that only vibrations impressed on the vessel 1 or on the electrode 3, but not those impressed on electrode 4, will be indicated by the device 14.

It has been found that the sensitivity of the present device is a function of the density of the current at said electrode-electrolyte junction, and not of the total intensity of the current passing through the electrode. An optimum density of current, which is different for various types of electrolytes, but should in general have a relatively high value, can obviously be most practically achieved by restricting said junction area. Too great a total intensity of current, no matter what type of electrolyte is used, will result in unbalancing the action of the detector, and will also result in depositing on the electrode a thick layer of material which will sometimes interfere with the sensitivity of the electrode. If the area of the electrode in contact with the electrolyte is reduced to a small value, such as 0.002 square inch, whereby the sensitive electrode is converted into substantially a point source, no more than a thin film, incapable of interfering with the sensitivity, will form on the electrode irrespective of the type of electrolyte or the intensity of the current used.

While the liquid filling the vessel 1 is herein referred to as an electrolyte or electrolytic liquid in the sense that it permits a current to pass therethrough and forms an electrolytic cell in combination with electrodes immersed therein, it is unnecessary, according to the present invention, for said liquid to have the conductive properties of a conventional electrolyte. While said electrolyte, therefore, may consist of an aqueous acid, alkali or salt solution, it may also consist of a liquid having substantially no conductive properties, such as distilled water.

By properly selecting the electrolytic liquid, and thus determining the resistance of the cell, the present detector can be best adapted to meet the requirement of any particular problem. Thus, for example, a sensitive low impedance detector is obtained by using a saturated solution of copper sulphate in the cell; a sensitive medium impedance detector is obtained by using ordinary tap water, and a sensitive high impedance detector is obtained by using distilled water.

Although, in general, the sensitive electrode 3 may be connected either to the anode or to the cathode of the source 7, a greater sensitivity will be obtained for some electrolytes, as for instance, distilled water, by making the sensitive electrode the anode, and for others, such as copper sulphate, by making the sensitive electrode the cathode of the cell.

The operation of the present device will be clear from the following examples given by way of illustration:

Example I

With the circuit shown in Fig. 1, a saturated copper sulphate solution was used as the electrolyte, a copper sheet as electrode 4, and a copper wire of No. 16 B. and S. gage, sealed as described above and exposing to the electrolyte an area of approximately 0.002 sq. in., as the sensitive electrode 3. The direct current internal resistance of the cell, as measured with an ohmmeter, was approximately 600 ohms. An audiotransformer adapted to match a 600 ohm line to the grid of the vacuum tube of the amplifier 13 was used at 8—9. Good sensitivity was obtained by connecting electrode 3 as the cathode of the cell and passing a current of 3 to 6 milliamperes through the cell. Current densities of the order of 2 or 3 amperes per square inch of the sensitive electrode-electrolyte junction are suitable with this arrangement. No copper is deposited on the cathode at this current density, which is about a hundred times that used in copper plating, although a thin black film, probably copper oxide, forms there without interfering with the operation of the device.

The amplification factor of amplifier 13 may be adjusted to a value of approximately one thousand, and the cathode ray oscillograph 14 may be adjusted to a sensitivity of one inch deflection for a potential of 40 volts applied to the oscillograph. With this arrangement, current variations of 5 microamperes in the circuit of the primary 8 will produce, through the secondary 9 and amplifier 13, a cathode ray trace of one inch amplitude on the screen of the oscillograph 14, as symbolically shown at 17.

Example II

The copper sulphate solution of Example I was replaced with ordinary tap water, and a No. 24 B. and S. gage copper wire was used for the electrode 3. The internal resistance of the cell, as measured with an ohmmeter, was found to be 10,000 ohms, and a suitable interstage type audiotransformer was used at 8—9 to match this resistance to the input of the amplifier. With the sensitive electrode 3 as the anode of the cell, good sensitivity was obtained for a current strength within a range from 0.2 to 1.0 milliampere, the cell tending to become unbalanced at the last high value. Especially good sensitivity was obtained at 0.4 milliampere.

Example III

Distilled water was used as the electrolyte, and a No. 16 B. and S. gage wire at the sensitive electrode, which was made the anode of the cell. The internal resistance of the cell being of the order of 170,000 ohms, the coupling between the cell and the amplifier shown in Fig. 1 was modified to the capacity type of coupling shown in Fig. 2, wherein 17 is a coil of about 500 henries inductance and 20,000 ohms resistance, 18 is a condenser of 1 microfarad capacity, and 19 is a resistance of 250,000 ohms, all other elements being denoted by the same numerals as in Fig. 1. The electrode 3 became extremely sensitive at a current of from 0.1 to 0.3 milliampere. Current densities of from 0.05 to 0.2 ampere per square inch of the sensitive electrode-electrolyte contact surface are suitable for this arrangement.

While the above description and examples have been given to explain the principles and method of operation of the present device, it is understood that actual embodiments thereof are susceptible of many structural variations for application to practical field use. When constructed in compact form, sealed against spilling and provided with suitable means for communicating the mechanical vibrations to the junction of the sensitive electrode with the electrolyte, said detectors can be successfully used for such purposes as seismic exploration, seismic well logging, submarine signalling, sound detection, etc.

Thus, Fig. 3 schematically illustrates an embodiment of the present invention adapted to be used as a seismometer or seismic detector.

This seismometer comprises a housing 34, which is hermetically sealed by means of a removable cover 31 and is adapted to be buried in the ground, at or near the surface thereof. Suspended within the housing 34, for example, by means of spring or springs 32 is a relatively heavy mass 36. Embedded in the mass 36 and held thereby is the sensitive electrode 33, similar to that shown at 3 in Fig. 1. An insulated conductor 35 electrically connects the wire within the electrode 33 through any desired indicating devices 10, transformers 8, etc., to a terminal of a source of current 7, whose other terminal may be grounded, the same amplifying and indicating means as in Figs. 1 or 2 being used for the arrangement of Fig. 3.

The housing 34, which may be made of a material such as copper, brass, aluminum, etc., being likewise grounded and being filled with an electrolytic liquid of any of the types described above, serves as the non-sensitive electrode 4 of Fig. 1 (although a non-sensitive electrode separate and suitably insulated from the housing may also be used), whereby the present device operates in the manner described with regard to that figure in detecting seismic waves or any other oscillations arriving at said device through the ground. It is, however, understood that, in order to operate as a seismometer, the present device does not necessarily have to have a resiliently supported sensitive electrode, but may be constructed along lines generally described with regard to Figs. 1 and 2.

Fig. 4 schematically illustrates an embodiment of the present invention adapted to be lowered into the fluid filling a borehole for purposes such as seismic logging, determination of ground velocities of seismic waves, etc.

This detector comprises a housing 44 having a removable cover 41. A cable 45, comprising an insulated conductor, is connected to the housing and serves to lower the detector into the borehole. The conductor of the cable 45 is electrically connected to the wire within the sealed sensitive electrode 43, whose junction area is exposed to the fluid within the housing 44. The housing 44 is similar to housing 34 of Fig. 3 in that it may serve, if desired, as the non-sensitive electrode, the electrical connections being likewise similar in this case to those of Fig. 3. The housing 44 is provided with perforations 44A, whereby the fluid of the borehole enters inside the housing and serves as the electrolytic fluid. The elastic waves set up in the well fluid are thus detected substantially without any energy transmission losses. An electrolytic sensitive electrode of the type of Fig. 6 may especially well be used in this case.

If, however, it is not desired to use the well fluid as the electrolyte, the perforated housing 44 may be covered with, or replaced by a thin fluid-tight diaphragm or membrane made of highly resilient or elastic material, the inside of the housing being in such case separated in a fluid-tight fashion from the outside fluid and filled with an electrolyte of any desired type, the oscillations or vibrations being transmitted to said liquid from the well fluid through said resilient diaphragm.

It is obvious that instead of being lowered into a well fluid, a detector similar to that of Fig. 4 may be placed in any liquid body, for example, in sea water, to detect any vibrations or elastic waves therein, for example, the pulsations from the propeller of a ship whose position it is desired to determine.

Such a submarine detector is schematically shown in Fig. 5 installed in the side 50 of a ship and comprising a housing 54, filled with a suitable electrolyte, electrodes 53 and 53A, held by an insulated bushing 51 and connected to the amplifying and indicating devices inside the ship by means of suitably insulated conductors 55, and a diaphragm or membrane 54A, although a perforated plate similar in effect to the perforated housing 44 of Fig. 4 may be used if it is desired to use the sea, lake or river water as the electrolyte.

The direction from which the vibrations are travelling may be determined, for example, by mounting two or more detectors 54 along the side of a ship or along the shore at suitable spacings from each other, and determining the phase lags between their responses. Fig. 7 shows an arrangement with regard to an elastic wave W arriving at an angle $\theta$ with regard to line on which the detectors 54 are mounted.

It is obvious that a device similar to that shown in Fig. 5, but preferably provided with a diaphragm or membrane having a large area, may also be installed on the surface of the ground for detecting and determining the point of origin of vibrations or pulsations impressed upon the diaphragm through a fluid medium such as air.

I claim as my invention:

In a system for detecting mechanical oscillations in a medium subject thereto by observing variations in an electric current responsive to said oscillations, an electrolytic cell adapted to be placed in contact with said medium, said cell confining an electrolytic liquid, two electrodes held in rigid relationship with regard to each other in contact with said liquid, one of said electrodes having a reduced area forming substantially a point contact with said liquid, said area being of the order of two thousandths of a square inch, and the other electrode having an extended area of contact with said liquid, and means for passing between said electrodes a direct current along a path through said liquid having a current density increasing toward said first electrode.

DAVID SAVILLE MUZZEY, JR.